US012670483B2

(12) United States Patent
Raghavan et al.

(10) Patent No.: US 12,670,483 B2
(45) Date of Patent: Jun. 30, 2026

(54) DATA TRANSACTIONS FACILITATING COLLECT-ON- DELIVERY

(71) Applicant: Motorola Mobility LLC, Chicago, IL (US)

(72) Inventors: Krishnan Raghavan, Bangalore (IN); Vijayprakash Idlur, Bangalore (IN); Prasad A G, Bengaluru (IN)

(73) Assignee: Motorola Mobility LLC, Chicago, IL (US)

( * ) Notice: Subject to any disclaimer, the term of this patent is extended or adjusted under 35 U.S.C. 154(b) by 16 days.

(21) Appl. No.: 18/759,927

(22) Filed: Jun. 30, 2024

(65) Prior Publication Data

US 2026/0004264 A1     Jan. 1, 2026

(51) Int. Cl.
*G06Q 20/08* (2012.01)
*G06Q 10/083* (2023.01)

(52) U.S. Cl.
CPC ......... *G06Q 20/085* (2013.01); *G06Q 10/083* (2013.01)

(58) Field of Classification Search
None
See application file for complete search history.

(56) References Cited

U.S. PATENT DOCUMENTS

| | | | |
|---|---|---|---|
| 10,733,563 B2 * | 8/2020 | Sager | B07C 3/00 |
| 12,333,476 B2 * | 6/2025 | Cui | G06Q 10/083 |
| 2004/0073801 A1 * | 4/2004 | Kalogridis | H04L 9/50 713/176 |
| 2019/0197555 A1 * | 6/2019 | Gupta | G06Q 20/4097 |

FOREIGN PATENT DOCUMENTS

WO        2003067531 A2      8/2003

* cited by examiner

*Primary Examiner* — Paul S Schwarzenberg
(74) *Attorney, Agent, or Firm* — FIG. 1 Patents

(57) ABSTRACT

In accordance with the described techniques, an indication is received that a collect-on-delivery order associated with a first user is scheduled to be delivered at a delivery location during a particular time slot. A first device of the first user and a second device of a second user are interconnected via a data sharing application, enabling sharing of location data between the devices. Based on the location data, a prediction is made that the first user will not be present but the second user will be present at the delivery location during the particular time slot. Given this, a data transaction is initiated from a first account associated with the first device to a second account associated with the second device, and the data transaction is initiated based on a data status of the second account being unable to meet a data transaction criterion of the collect-on-delivery order.

20 Claims, 8 Drawing Sheets

200

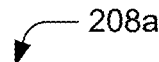

208a

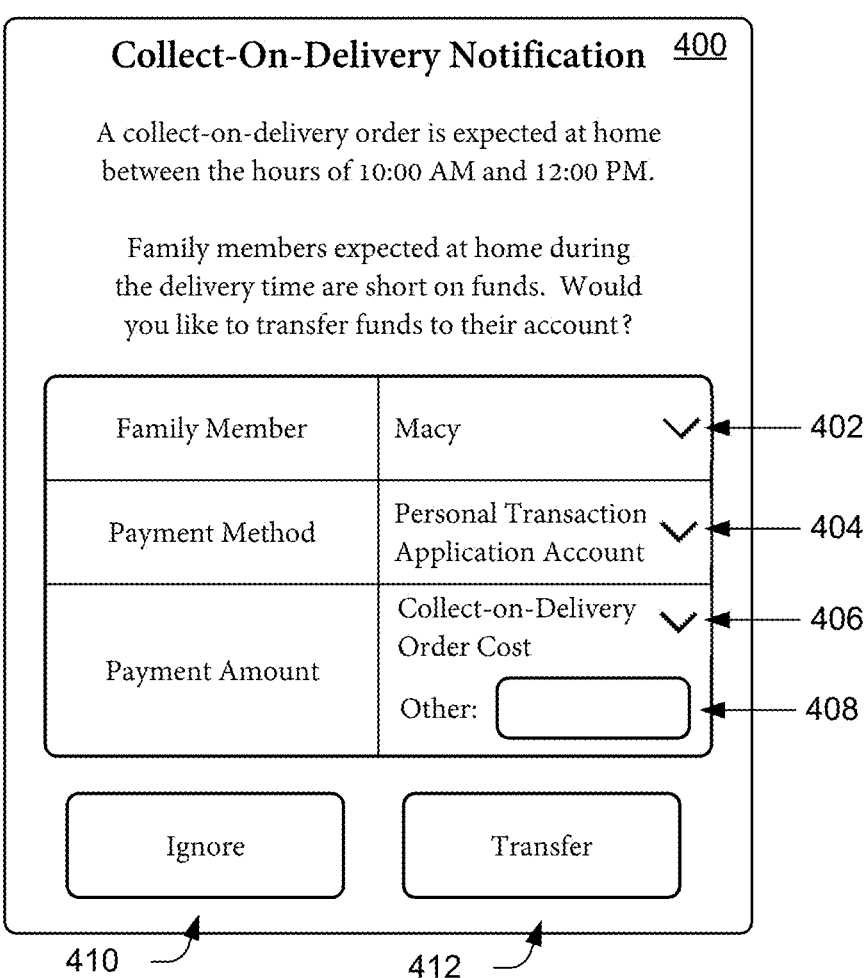

Collect-On-Delivery Notification  400

A collect-on-delivery order is expected at home
between the hours of 10:00 AM and 12:00 PM.

Family members expected at home during
the delivery time are short on funds.  Would
you like to transfer funds to their account?

| Family Member | Macy ⌄ | — 402 |
|---|---|---|
| Payment Method | Personal Transaction ⌄ Application Account | — 404 |
| Payment Amount | Collect-on-Delivery ⌄ Order Cost | — 406 |
| | Other: [_____] | — 408 |

| Ignore | Transfer |
|---|---|

Collect-On-Delivery Notification

A collect-on-delivery order is expected at home
between the hours of 10:00 AM and 12:00 PM.

Millie is expected to be at home during the
delivery time.  Please leave Millie with a means of
payment to complete the collect-on-delivery order.

| Collect-on-Delivery Order Cost | $120.00 |
|---|---|

Dismiss

500

Figure 6:
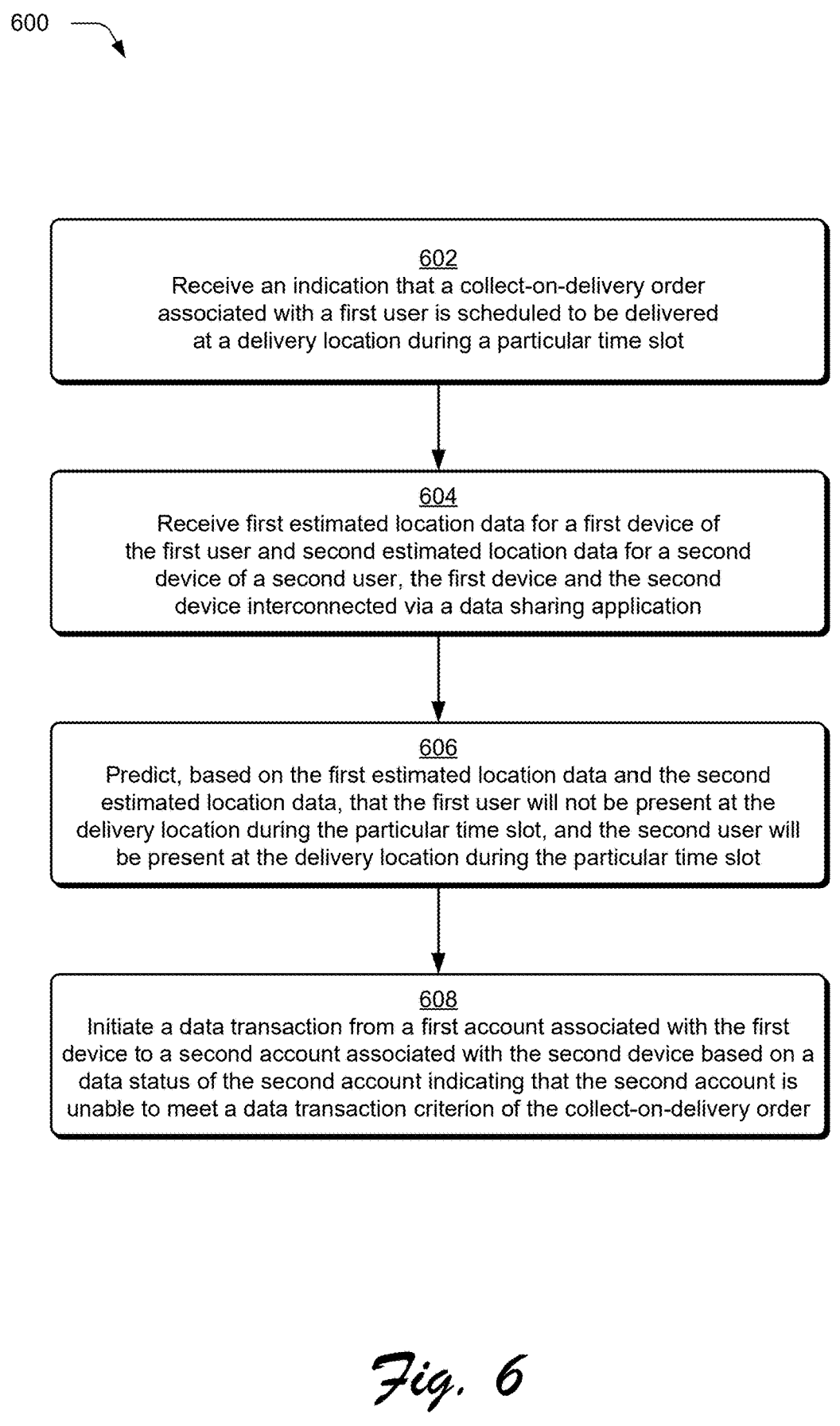

600 —

602
Receive an indication that a collect-on-delivery order
associated with a first user is scheduled to be delivered
at a delivery location during a particular time slot

604
Receive first estimated location data for a first device of
the first user and second estimated location data for a second
device of a second user, the first device and the second
device interconnected via a data sharing application

606
Predict, based on the first estimated location data and the second
estimated location data, that the first user will not be present at the
delivery location during the particular time slot, and the second user will
be present at the delivery location during the particular time slot

608
Initiate a data transaction from a first account associated with the first
device to a second account associated with the second device based on a
data status of the second account indicating that the second account is
unable to meet a data transaction criterion of the collect-on-delivery order

Figure 7:
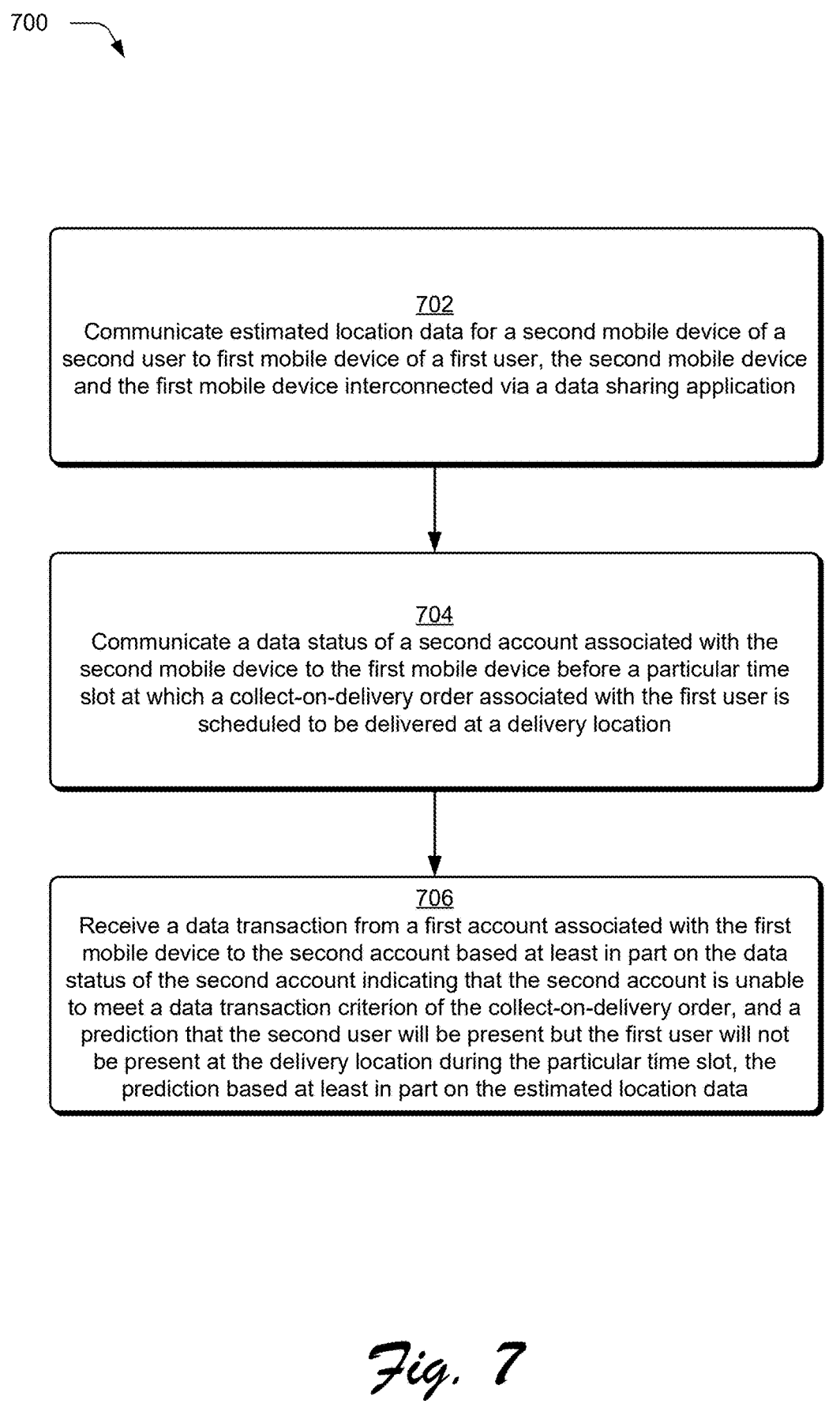

702
Communicate estimated location data for a second mobile device of a second user to first mobile device of a first user, the second mobile device and the first mobile device interconnected via a data sharing application

704
Communicate a data status of a second account associated with the second mobile device to the first mobile device before a particular time slot at which a collect-on-delivery order associated with the first user is scheduled to be delivered at a delivery location

706
Receive a data transaction from a first account associated with the first mobile device to the second account based at least in part on the data status of the second account indicating that the second account is unable to meet a data transaction criterion of the collect-on-delivery order, and a prediction that the second user will be present but the first user will not be present at the delivery location during the particular time slot, the prediction based at least in part on the estimated location data

Device   800

Memory Device(s)
812

Device
Data
804

Device
Applications
814

Operating
System
816

COD Facilitation
Module 818

Processor
System
808

Processing
& Control
810

Power
Sources
826

Camera
820

Audio / Video
Processing
828

Wireless Module
824

Communication
Tranceiver(s)
802

Data Input
Port(s)
806

Media Data
Port
834

Sensors
822

Audio
System
830

Display
System
832

DATA TRANSACTIONS FACILITATING COLLECT-ON- DELIVERY

BACKGROUND

A collect-on-delivery order is a transaction in which a consumer elects to pay for a product when the product is delivered, rather than when the product is ordered. While collect-on-delivery fosters a sense of security in delivered products and makes delivery available to a wider range of consumers, it is not without challenges. For instance, consumers often fail to arrange for means of payment to be available at a delivery location when a collect-on-deliver order is scheduled to be delivered, resulting in failed delivery attempts. Failed delivery attempts are not only an inconvenience to the consumer, the purveyor of the product, and the deliverer of the product, but also result in wastage of computational resources, e.g., spent rescheduling delivery, updating tracking systems, communicating notifications of failed delivery attempts and/or newly scheduled delivery times, and the like.

BRIEF DESCRIPTION OF THE DRAWINGS

Aspects of data transactions facilitating collect-on-delivery are described with reference to the following Figures. The same numbers may be used throughout to reference similar features and components that are shown in the Figures. Further, identical numbers followed by different letters reference different instances of features and components described herein.

FIG. 4 depicts an example user interface depicting a notification displayed in accordance with data transactions facilitating collect-on-delivery;

FIG. 6 illustrates a flow chart depicting an example method of data transactions facilitating collect-on-delivery in accordance with one or more implementations;

FIG. 7 illustrates a flow chart depicting an example method of data transactions facilitating collect-on-delivery in accordance with one or more implementations;

DETAILED DESCRIPTION

Figure 1:
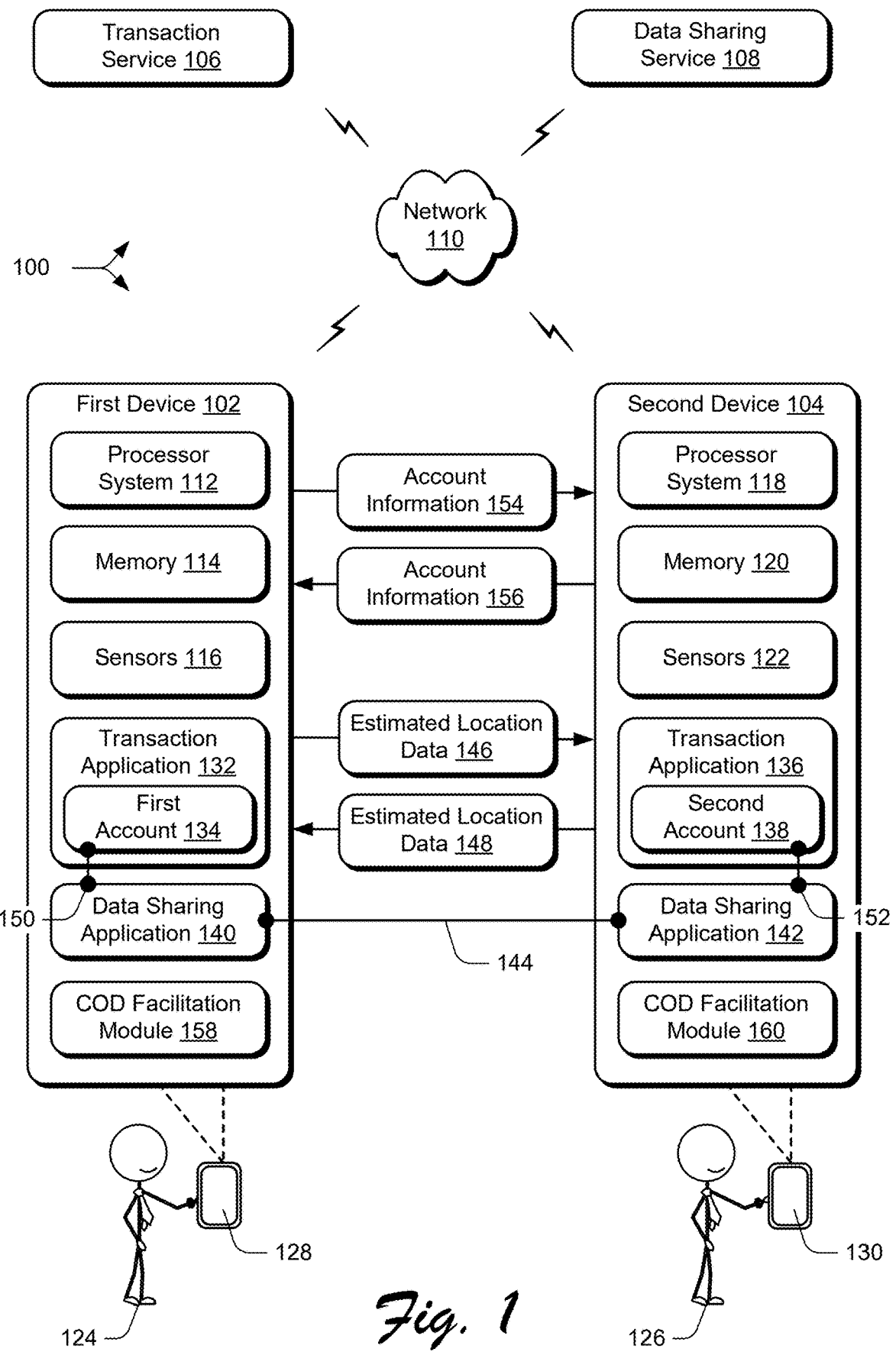
FIG. 1 illustrates an example environment in which aspects of data transactions facilitating collect-on-delivery can be implemented.

Broadly, a collect-on-delivery (COD) order is a transaction in which a consumer orders a product to be delivered, and elects to pay for the product at the time the product is delivered, rather than at the time that the product is ordered. Scenarios can occur, however, where the consumer is not present at the delivery location when the product is delivered and/or the consumer forgets to arrange for a valid payment method to be available at the delivery location when the product is delivered. The result of this scenario is a failed delivery attempt which inconveniences the consumer, the purveyor of the product, and a delivery service that delivers the product. Indeed, the consumer is delayed from receiving the product, and oftentimes is penalized in some manner for missing the delivery. The purveyor of the product is delayed from receiving payment, and the delivery service wastes time and resources making a failed delivery attempt.

To alleviate these inconveniences, techniques for data transactions facilitating collect-on-delivery orders are discussed herein. The described techniques, for instance, can be implemented by a first device communicatively coupled with a second device, e.g., over a network. In accordance with the described techniques, a first device (associated with a first user) and a second device (associated with a second user) have installed and/or accessible thereon different instances of a data sharing application as well as different instances of a transaction application.

The first user maintains a first account on the transaction application, and the first account has an account balance representing an amount of value that is transferable from the first account. Similarly, the second user maintains a second account on the transaction application, and the second account has an account balance representing an amount of value that is transferable from the second account. Given this, the transaction application is representative of functionality for enabling payment transactions, e.g., between accounts of the transaction application and/or to other payment receival devices and mechanisms, such as point-of-sale devices.

The data sharing application is representative of functionality for enabling the first device and the second device to exchange device data and personal data. As part of this, the first device and the second device are interconnected via the data sharing application. By way of example, the first user and the second user have provided consent, via the data sharing application, to being in a data sharing group, which permits sharing of various types of personal data and/or device data between the first device and the second device. This consent is facilitated via communication exchanges between the first device and the second device of requests to share certain types of data, and corresponding acceptances of said requests.

In accordance with the described techniques, the interconnection of the first device and the second device via the data sharing application enables exchanging of location data and account information between the devices. In one or more examples, the location data indicates a current location of the devices and/or estimated future locations of the devices, e.g., based on calendar data indicating future scheduled events and/or historical location patterns associated with the devices. Furthermore, the account information indicates an account balance of the accounts of the first user and the second user with the transaction application.

Given this, the first device includes a COD facilitation module configured to facilitate the second user and the second device completing a COD order on behalf of the first user and the first device. As part of this, the COD facilitation module receives an indication of a COD order associated with the first user that includes a delivery location of the COD order, a delivery time slot of the COD order, and a data transaction criterion of the COD order, e.g., a cost and/or an amount of value to be tendered to complete the COD order. Based on the location data of the first device and the second device, the COD facilitation module predicts that the first user (and the first device) will not be present at the delivery location during the delivery time slot, but the second user (and the second device) will be present at the delivery location during the time slot. Furthermore, the COD facilitation module detects, based on the account information of the second account, that a data status of the second account is unable to meet the data transaction criterion of the COD order, e.g., the second account has an insufficient account balance to cover the order cost of the COD order.

Accordingly, the COD facilitation module initiates a data transaction (e.g., a payment transaction) from the first account to the second account, and the payment transaction is for an amount of value sufficient to cover the order cost of the COD order. Consider an example in which the first user and the second user are members of a family. In this example, the described techniques enable a first family member to complete a COD order on behalf of a second family member in situations in which the second family member is away from home (e.g., a delivery location) when the COD order is scheduled to be delivered. Furthermore, the described techniques enable the first family member to complete the COD order despite the first family member originally having an insufficient account balance to complete the COD order.

Thus, techniques discussed herein initiate data transactions between devices to facilitate completion of COD orders. In implementations, a payment transaction represents a data transaction. For instance, digital payment transactions involve generating, transmitting, and processing various types of data and across a variety of different systems and networks. Accordingly, such digital payment transactions can be characterized as sets of computational operations much like other operations of a computing device and/or set of computing devices. By automatically initiating data transactions in scenarios in which a user associated with a COD order will not be present at the delivery location, the described techniques reduce failed deliveries of COD orders. Since each failed delivery attempt will trigger various computational processes (e.g., rescheduling delivery, updating tracking systems, and issuing communications notifying of failed delivery attempts and/or newly scheduled delivery times), reducing failed delivery attempts conserves system resources (e.g., memory, processor bandwidth, network bandwidth) that may otherwise be used to remedy failed delivery attempts. In other words, the described techniques can improve the operation of computing devices and data networks involved in COD orders. Further, user burden is reduced by alleviating the user of the responsibility of remembering when COD orders are going to be delivered, and arranging for the COD order to be completed on the user's behalf, thereby improving user experience with the collect-on-delivery process.

While features and concepts of data transactions facilitating collect-on-delivery can be implemented in any number of environments and/or configurations, aspects the described techniques are described in the context of the following example systems, devices, and methods. Further, the systems, devices, and methods described herein are interchangeable in various ways to provide for a wide variety of implementations and operational scenarios.

FIG. 1 illustrates an example environment 100 in which aspects of data transactions for collect-on-delivery can be implemented. The environment 100 includes a first device 102, a second device 104, a transaction service 106, and a data sharing service 108 that are communicatively coupled over a network 110. In the illustrated example, the first device 102 is a first mobile device (e.g., a first smartphone), and the second device 104 is a second mobile device, e.g., a second smartphone. However, these examples are not to be construed as limiting. Rather, the first device 102 and the second device 104 are configurable in a variety of ways, examples of which include desktop computers, laptop computers, tablet devices, and/or any other type of electronic or communication device.

In one or more examples, the first device 102 is implemented with various hardware components, such as a processor system 112, memory 114, and sensors 116, while the second device 104 is implemented with similar components, such as a processor system 118, a memory 120, and sensors 122. Examples of the sensors 116, 122 include, but are not limited to, digital cameras, microphones, and global positioning system (GPS) sensors for location tracking. The devices 102, 104 are also implemented with any number and any combination of different components, as further discussed below with reference to the example device 800 of FIG. 8.

The first device 102 is associated with a first user 124, and the second device 104 is associated with a second user 126. By way of example, the first user 124 is an owner and/or a registered user of the first device 102, and the second user 126 is an owner and/or a registered user of the second device 104. As shown, the first device 102 includes a display device 128 representative of functionality for output of graphical content via the first device 102. Similarly, the second device 104 includes a display device 130 representative of functionality for output of graphical content via the second device 104. In one or more implementations, the display devices 128, 130 additionally include touch input functionality, such as to enable the users 124, 126 to provide input to the devices 102, 104 via touch input to the display devices 128, 130.

As shown, the first device 102 includes a transaction application 132, which together with the transaction service 106, represents functionality for facilitating payment transactions to and from a first account 134 maintained by the first user 124 with the transaction service 106. Similarly, the second device 104 includes a transaction application 136, which together with the transaction service 106, represents functionality for facilitating payments to and from a second account 138 maintained by the second user 126 with the transaction service 106.

By way of example, the transaction application 132 corresponds to software instructions stored in memory 114 that are executable by the processor system 112 to provide user-facing interfaces and functionality for conducting payment transactions via the first device 102. Similarly, the transaction application 136 corresponds to software instructions stored in memory 120 that are executable by the processor system 118 to provide user-facing interfaces and functionality for conducting payment transactions via the second device 104. In one or more examples, the transaction applications 132, 136 correspond to different instances of the same application installed on different devices 102, 104. Furthermore, the transaction service 106 provides the back-end infrastructure, hardware resources, and/or a network that processes payment transactions, ensuring that payments are authorized and settled correctly. In one or more implementations, the first account 134 is associated with an account balance including an amount of funds that are transferrable from the first account 134, while the second account 138 is associated with an account balance including an amount of funds that are transferrable from the second account 138, e.g., to other accounts of the transaction service 106 and/or to other payment receival devices and mechanisms, such as point-of-sale devices.

In addition, the first device 102 includes a data sharing application 140, and the second device 104 includes a data sharing application 142. Broadly, the data sharing applications 140, 142, together with the data sharing service 108, represent functionality for exchanging data between the first device 102 and the second device 104. For instance, the first device 102 and the second device 104 are interconnected via the data sharing applications 140, 142 and/or the data sharing service 108, as shown at 144. By way of example, the users 124, 126 have provided consent, via the data sharing application 140, 142, to being in a data sharing group, which permits sharing of various types of personal data and/or device data between the devices 102, 104.

Here, the data sharing application 140 corresponds to software instructions stored in memory 114 that are executable by the processor system 112 to provide user-facing interfaces and functionality for displaying data shared with the first device 102 and managing other users and/or devices with which to share data. Similarly, the data sharing application 142 corresponds to software instructions stored in memory 120 that are executable by the processor system 118 to provide user-facing interfaces and functionality for displaying data shared with the second device 104 and managing other users and/or devices with which to share device data and personal data. Furthermore, the data sharing service 108 provides the backend infrastructure, hardware resources, and/or network for storing and managing shared data securely, encrypting shared data, and the like.

In one example, the interconnection of the devices 102, 104 via the data sharing application 140, 142 and/or the data sharing service 108 enables location sharing between the devices 102, 104. As part of this, the first device 102 communicates estimated location data 146 to the second device 104 over the network 110. The estimated location data 146 is indicative of where the first device 102 (and the first user 124) is currently located and/or where the first device 102 (and the first user 124) is expected to be located at some point in the future. Similarly, the second device 104 communicates estimated location data 148 to the first device 102 over the network 110. The estimated location data 148 is indicative of where the second device 104 (and the second user 126) is currently located and/or where the second device 104 (and the second user 126) is expected to be located in the future. Given this, the first device 102 includes data indicating the whereabouts of the second device 104 and the second user 126, while the second device 104 includes data indicating the whereabouts of the first device 102 and the first user 124.

In another example, the interconnection of the devices 102, 104 via the data sharing application 140, 142 and/or the data sharing service 108 enables sharing of transaction application account information between the devices 102, 104. For example, the first account 134 is linked with the data sharing application 140, as shown at 150. Further, the second account 138 is linked with the data sharing application 142, as shown at 152. Moreover, the first user 124 has provided user input (e.g., via a user interface of the data sharing application 140) consenting to share account information with the second device 104 and the second user 126. Furthermore, the second user 126 has provided user input (e.g., via a user interface of the data sharing application 142) consenting to share account information with the first device 102 and the first user 124.

Given this, the data sharing application 140 receives account information 154 of the first account 134, and communicates the account information 154 to the second device 104 over the network 110. Similarly, the data sharing application 142 receives account information 156 from the second account 138 and communicates the account information 156 to the first device 102 over the network 110. By way of example and not limitation, the account information 154 includes the account balance of the first account 134, and the account information 156 includes the account balance of the second account 138. In this way, the first device 102 includes data indicating an account balance of the second account 138 of the second user 126, and the second device 104 includes data indicating an account balance of the first account 134 of the first user 124.

In one or more implementations, the applications 132, 136, 140, 142 are made available by a multi-service platform of a service provider system. By way of example, the transaction service 106 and the data sharing service 108 are implemented, in part, by server devices of a service provider system. Moreover, the service provider system includes or corresponds to a multi-service platform including the transaction service 106, the data sharing service 108, and any one or more of a variety of different digital services, e.g., digital marketplace services, content streaming services, gaming services, and the like. As part of this, the first device 102 includes an integrated services application (e.g., also known as a "super app"), and the integrated services application includes the transaction application 132, the data sharing application 140, and/or other service-based applications, e.g., also known as "mini apps." Similarly, the second device 102 includes an integrated services application, and the integrated services application includes the transaction application 136, the data sharing application 142, and/or other service-based applications. For instance, the integrated services application and/or the multi-service platform enable a cohesive, personalized user experience across a variety of different digital services by sharing data between different service-based applications that have a common look and feel.

As shown, the first device 102 includes a collect-on-delivery (COD) facilitation module 158, while the second device 104 includes a COD facilitation module 160. The COD facilitation module 158, 160, for example, is representative of functionality for facilitating completion of COD orders. As used herein, a "collect-on-delivery" order is a transaction in which a consumer orders a product to be delivered, and elects to pay for the product at the time the product is delivered, rather than at the time the product is ordered. Scenarios may occur, however, where the consumer is not at the delivery location when the product is delivered, and the consumer forgets to arrange for a valid payment method to be available at the delivery location at the time of delivery. As a result, a failed delivery attempt occurs, thereby delaying the consumer from receiving the product, and delaying the purveyor of the product from receiving payment.

Given this, the COD facilitation module 158 is representative of functionality for initiating a payment transaction to the second account 138 to facilitate completion of a COD order associated with the first user 124. As part of this, the COD facilitation module 158 receives an indication of a COD order associated with the first user 124 scheduled to be delivered at a delivery location during a particular time slot. Based on the estimated location data 146, 148, the COD facilitation module 158 generates a prediction that the first user 124 will not be present at the delivery location during the particular time slot, but the second user 126 will be present at the delivery location during the particular time slot. Furthermore, the COD facilitation module 158 determines, based on the account information 156, that the account balance of the second account 138 is insufficient to complete the COD order. Given the prediction and the inability of the second account 138 to complete the COD order, the COD facilitation module 158 initiates a payment transaction from the first account 134 to the second account 138. This enables the second user 126 who is present at the delivery location to complete the COD order on behalf of the first user 124 using the second account 138.

The COD facilitation module 160 represents similar functionality for initiating a payment transaction to the first account 134 to facilitate completion of a COD order associated with the second user 126. For example, the COD facilitation module 160 receives an indication of a COD order associated with the second user 126 scheduled to be delivered at a delivery location during a particular time slot. Based on the estimated location data 146, 148, the COD facilitation module 160 generates a prediction that the second user 126 will not be present at the delivery location during the particular time slot, but the first user 124 will be present at the delivery location during the particular time slot. Furthermore, the COD facilitation module 160 determines, based on the account information 154, that the account balance of the first account 134 is insufficient to complete the COD order. Given the prediction and the inability of the first account 134 to complete the COD order, the COD facilitation module 158 initiates a payment transaction from the second account 138 to the first account 134. This enables the first user 124 who is present at the delivery location to complete the COD order on behalf of the second user 126 using the first account 134.

Although the example environment 100 includes two devices 102, 104, it is to be appreciated that any number of devices associated with any number of users are interconnected via data sharing applications and/or the data sharing service 108. As a result, the environment 100 includes any number of interconnected devices having an ability to exchange estimated location data and account information, and including an instance of the COD facilitation module. Thus, while examples are described herein in which the COD facilitation module 158 of the first device 102 initiates a payment transaction to facilitate completion of a COD order on behalf of the first user 124, similar operations are performable by any number of devices (e.g., the second device 104) interconnected in a data sharing environment.

Having discussed an example environment in which the disclosed techniques can be performed, consider now some example scenarios and implementation details for implementing the disclosed techniques.

Figure 2:
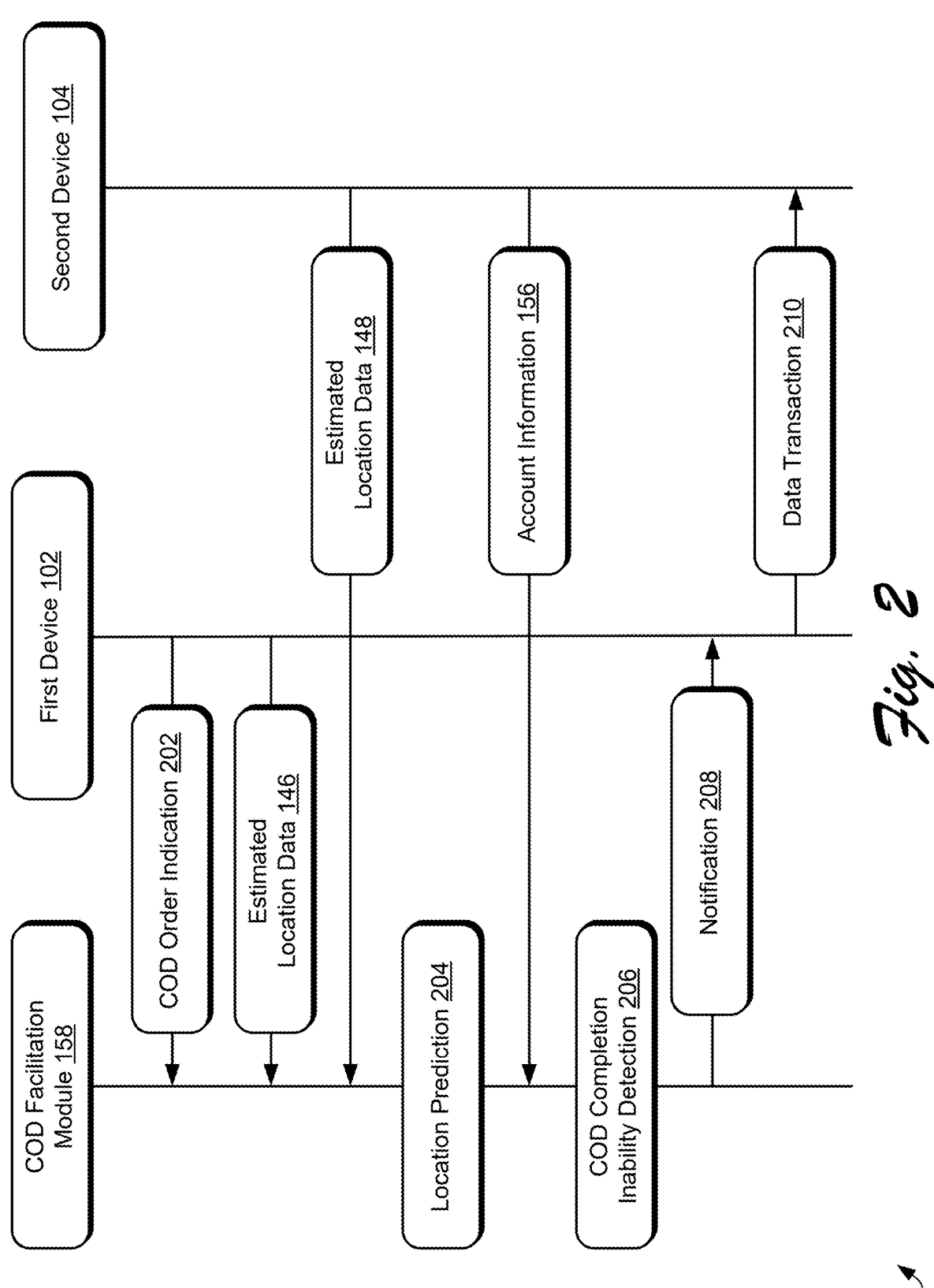
FIG. 2 illustrates an example system for data transactions facilitating collect-on-delivery.

FIG. 2 illustrates an example system 200 for data transactions facilitating collect-on-delivery. As shown, the system 200 includes the first device 102, the second device 104, and the COD facilitation module 158 of the first device 102. Initially, the COD facilitation module 158 receives a COD order indication 202 indicating that a COD order associated with the first user 124 is scheduled to be delivered at a delivery location during a particular time slot. By way of example, the COD order indication 202 includes an indication of a delivery location, an indication of a delivery time slot, and an indication of a transaction criterion associated with the COD order, e.g., an order cost of the COD order. In at least one example, the first user 124 and the second user 126 are cohabitants, and the delivery location is the home address of the first user 124 and the second user 126.

In one or more implementations, an application installed on the first device 102 communicates the COD order indication 202 to the COD facilitation module 158. In various examples, the COD order indication 202 is received from an email application based on an email message including information associated with the COD order, or from an electronic marketplace application via which the COD order was placed including order status information associated with the COD order.

Furthermore, the COD facilitation module 158 receives the estimated location data 146 associated with the first device 102. The estimated location data 146 includes current location data of the first device 102, calendar data of the first device 102, and/or historical location patterns of the first device 102. In one example, the COD facilitation module 158 receives the current location data (e.g., GPS data) from the sensors 116 (e.g., GPS sensors) of the first device 102, and the current location data indicates a current physical location of the first device 102. Additionally or alternatively, the COD facilitation module 158 receives calendar data from a calendar application installed on the first device 102 indicating times and locations of future scheduled events.

Additionally or alternatively, the COD facilitation module 158 receives historical location patterns of the first device 102 from the data sharing application 140. By way of example, the data sharing application 140 collects historical location data of the first device 102 indicating days, times of day, and physical locations where the first device 102 has been located. Based on the historical location data, the data sharing application 140 detects historical location patterns associated with the first device 102 indicating days, times of day, and physical locations where the first device 102 is typically located. For example, if the first user 124 travels to work Mondays through Fridays from the hours of 8:00 AM to 5:00 PM, the historical location patterns of the first device 102 indicate that the first device 102 and the first user 124 are typically located at the first user's place of work on Mondays through Fridays from the hours of 8:00 AM to 5:00 PM.

In addition, the COD facilitation module 158 receives the estimated location data 148 associated with the second device 104. The estimated location data 148 includes current location data of the second device 104, calendar data of the second device 104, and/or historical location patterns of the second device 104. By way of example, the data sharing application 142 collects current location data (e.g., GPS data) from the sensors 122 (e.g., GPS sensors) of the second device 104, and communicates the current location data to the COD facilitation module 158. Additionally or alternatively, the data sharing application 142 collects calendar data from a calendar application installed on the second device 104 indicating times and days associated with future scheduled events, and communicates the calendar data to the COD facilitation module 158. Additionally or alternatively, the data sharing application 142 detects historical location patterns associated with the second device 104, and communicates the historical location patterns to the COD facilitation module 158. The historical location patterns of the second device 104 are detected similarly to the historical location patterns of the first device 102.

Based on the estimated location data 146 of the first device 102 and the estimated location data 148 of the second device 104, the COD facilitation module 158 executes a location prediction 204 by predicting that the first user 124 will not be present at the delivery location during the delivery time slot, and predicting that the second user 126 will be present at the delivery location during the delivery time slot. In various examples, the COD facilitation module 158 predicts that the first user 124 will not be present at the delivery location during the delivery time slot based on current location data indicating that the first user 124 is currently away from the delivery location, calendar data indicating a future scheduled event away from the delivery location at the delivery time slot, and/or a historical location patterns indicating that the first user 124 is typically away from the delivery location during the delivery time slot. Similarly, the COD facilitation module 158 predicts that the second user 126 will be present at the delivery location during the delivery time slot based on current location data indicating that the second user 126 is currently at the delivery location, calendar data indicating a lack of future scheduled events scheduled away from the delivery location at the delivery time slot, and/or historical location patterns indicating that the second user 126 is typically at the delivery location during the delivery time slot.

As shown, the second device 104 communicates account information 156 of the second account 138 of the second user 126 to the COD facilitation module 158. By way of example, the COD facilitation module 158 requests the account information 156 from the data sharing application 142 of the second device 104. In one or more implementations, the COD facilitation module 158 requests the account information 156 based on a predetermined amount of time remaining until the delivery time slot, and/or a determination that the first user 124 is at the delivery location but about to leave the delivery location, e.g., the determination is based on the estimated location data 146. Upon receiving the request, the data sharing application 142 of the second device 104 polls the transaction application 136 of the second device 104 for the account information 156 of the second account 138 and communicates the account information 156 to the COD facilitation module 158. Here, the account information 156 includes a data status of the second account 138, e.g., an account balance of the second account 138.

Next, the COD facilitation module 158 executes a COD completion inability detection 206, e.g., the COD facilitation module 158 detects that the second account 138 of the second user 126 is unable to complete the COD order on behalf of the first user 124. In various examples, this is because a data status of the second account 138 is unable to meet the data transaction criterion of the COD order, e.g., the account balance of the second account 138 is insufficient to cover the order cost of the COD order.

Based on the location prediction 204 and the COD completion inability detection 206, the COD facilitation module 158 displays a notification 208 in a user interface of the display device 128 of the first device 102. In one or more implementations, the notification 208 includes an indication of when the COD order is scheduled to be delivered at the delivery location, an indication that the second user 126 will be present at the delivery location during the delivery time slot, and an indication that the second account 138 of the second user 126 is unable to complete the COD order due to an insufficient account balance. In addition, the notification 208 includes a user interface element that is selectable to initiate a data transaction 210 (e.g., a payment transaction) from the first device 102 to the second device 104.

In response to a user selection of the user interface element, the first device 102 initiates the data transaction 210 (e.g., a payment transaction) from the first device 102 to the second device 104. More specifically, the initiation of the data transaction 210 causes the first account 134 of the first device 102 to transfer data resources to the second account 138 of the second device 104. In various examples, the transfer of data resources is for an amount of funds that is equal to the order cost of the COD order, an amount of funds that is equal to a difference between the account balance of the second account 138 and the order cost of the COD order, or an amount of funds corresponding to a predefined buffer amount added to the difference between the order cost and the account balance of the specified payment method.

Although examples are discussed herein in which the data transaction 210 is initiated based on the location prediction 204 and the COD completion inability detection 206, it is to be appreciated that the data transaction 210 in initiable on the basis of the location prediction 204 solely. In one or more examples, for instance, the data transaction 210 (e.g., the payment transaction) to the second account 138 is made based on the location prediction 204 that the first user 124 will not be present, but the second user 126 will be present at the delivery location during the delivery time slot, regardless of whether the second account 138 has a sufficient account balance to complete the COD order.

Figure 3:
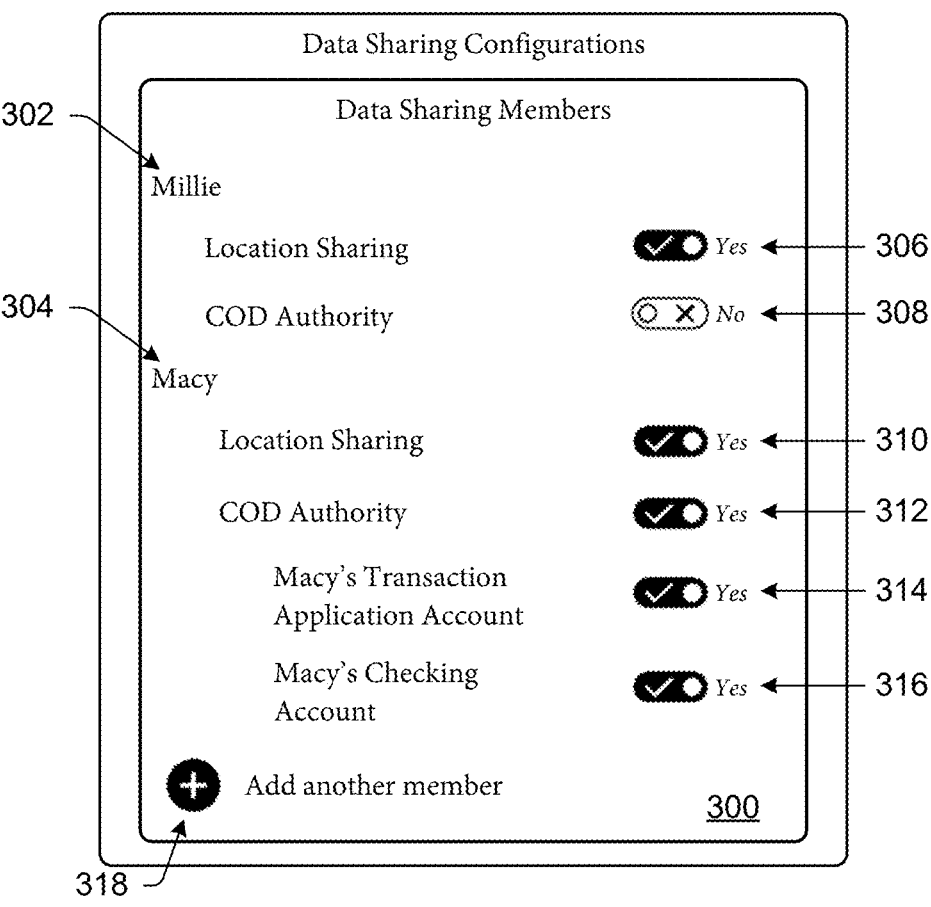
FIG. 3 depicts an example user interface for specifying data sharing preferences in accordance with techniques for data transactions facilitating collect-on-delivery.

FIG. 3 depicts an example user interface 300 for specifying data sharing preferences in accordance with techniques for data transactions facilitating collect-on-delivery. In particular, the user interface 300 is a user interface of the data sharing application 140 displayed via the display device 128 of the first device 102 for specifying data sharing specifications for data sharing members of a data sharing group. In particular, the data sharing group includes the first user 124, a first data sharing member 302, and a second data sharing member 304. The user interface element 306 is selectable by the first user 124 to communicate a request to a device of the first data sharing member 302 to share location data with the first user 124. Here, an acceptance of the request has been received from the device of the first data sharing member 302, and as such, location sharing is enabled, as shown. Further, the user interface element 308 is selectable to delegate authority to the first data sharing member 302 to complete COD orders on behalf of the first user 124. Here, COD authority is not delegated, meaning that the first user 124 has not requested that the first data sharing member 302 complete COD orders on behalf of the first user 124, or the first data sharing member 302 has denied a request to complete COD orders on behalf of the first user 124.

The user interface element 310 is selectable by the first user 124 to initiate location sharing with the second data sharing member 304, and as shown, location sharing is enabled, e.g., the first device 102 has communicated a request to a device of the second data sharing member 304 to share location data with the first user 124, and the request has been accepted by the second data sharing member 304. Furthermore, the user interface element 312 is selectable by the first user 124 to delegate authority to the second data sharing member 304 to complete COD orders on behalf of the first user 124. Here, COD authority is delegated. This means that, in response to a user selection of the user interface element 312, the first device 102 has communicated a request to a device of the second data sharing member 304 requesting that the second data sharing member 304 accept responsibility to complete COD orders on behalf of the first user 124. Further, an acceptance of the request by the second data sharing member 304 has been received from the device of the second data sharing member 304.

As part of accepting the request, the second data sharing member 304 has specified various payment methods for which the second data sharing member 304 consents to sharing account information with the first user 124. Here, the payment methods specified by the acceptance include a transaction application account. By way of example, the second data sharing member 304 is the second user 126 and the payment methods of the acceptance include the second account 138 on the transaction application 136. In addition, the payment methods include a personal checking account of the second data sharing member 304, e.g., with a bank. Any one or more of a variety of different types of payment methods are employable in accordance with techniques for data transactions facilitating collect-on-delivery. The user interface elements 314, 316 are selectable by the first user 124 to give final approval regarding which payment methods the second data sharing member 304 is able to use to complete COD orders on behalf of the first user 124. Here, the first user 124 has enabled the second data sharing member 304 to complete COD orders on behalf of the first user using both the transaction application account and the personal checking account, e.g., via interaction with the user interface elements 314, 316. Furthermore, the user interface element 318 is selectable by the first user to add additional data sharing members to the data sharing group.

FIG. 4 depicts an example user interface 400 depicting a notification displayed in accordance with data transactions facilitating collect-on-delivery. The user interface 400 includes a notification 208a displayed on the display device 128 of the first device 102. More specifically, the notification 208a is displayed responsive to at least one of (1) a location prediction 204 that the first user 124 will not be present at the delivery location during the delivery time slot but at least one data sharing member of the data sharing group will be present at the delivery location during the delivery time slot, (2) the at least one data sharing member is associated with an account marked with an ability to complete COD orders on behalf of the first user 124 via the data sharing service 108, and (3) the at least one data sharing member is unable to complete the COD order due to an insufficient account balance.

As shown, the notification 208a includes an indication of when the COD order is scheduled to be delivered, an indication that at least one data sharing member is expected to be at the delivery location during the delivery time slot, and an indication that the at least one data sharing member expected to be at the delivery location is unable to complete the COD order due to an insufficient account balance. Here, the notification 208a includes a user interface element 402 (e.g., a drop-down menu) that is selectable to specify a particular data sharing member within the data sharing group to complete the COD order. Upon selection of the user interface element 402, for instance, the notification 208a displays a list of the data sharing members within the data sharing group that are expected to be at the delivery location during the delivery time slot, and have been associated with an ability to complete COD orders on behalf of the first user 124 via the data sharing service 108. In other words, the data sharing members in the list exclude data sharing members that are expected to be away from the delivery location at the delivery time slot, and data sharing members that do not have an account marked with an ability to complete COD orders on behalf of the first user 124 via the data sharing service 108. The first user 124 can select which data sharing member to complete the COD order from the list of displayed data sharing members.

Furthermore, the notification 208a includes a user interface element 404 (e.g., a drop-down menu) that is selectable to specify a particular payment method of the selected data sharing member to be used to complete the COD order. Upon selection of the user interface element 404, for instance, the notification 208a displays a list of payment methods of the selected data sharing member marked with an ability to complete COD orders on behalf of the first user 124 via the data sharing service 108. The first user 124 can select which payment method to complete the COD order from the list of displayed payment methods.

In one or more implementations, the notification 208a further includes a user interface element 406 (e.g., a drop-down menu) that is selectable to specify a payment amount for a payment transaction to the specified payment method of the specified data sharing member. Upon selection of the user interface element 406, the notification 208a displays a list of predefined payment amounts, such as an order cost of the COD order, a difference between the order cost and the account balance of the specified payment method, or an amount corresponding to a predefined buffer amount added to the difference between the order cost and the account balance of the specified payment method. Additionally or alternatively, the first user 124 can input a custom payment amount via input box 408.

The user interface element 410 is selectable to ignore and/or dismiss the notification 208a without initiating a payment transaction. Furthermore, the user interface element 412 is selectable to initiate a payment transaction in accordance with the selections made via the user interface elements 402, 404, 406 and/or the input box 408. Here, selection of the user interface element 412 initiates a payment transaction for the order cost of the COD order to the transaction application account of the second data sharing member 304. By way of example, the second data sharing member 304 corresponds to the second user 126 and the payment transaction is made from the first account 134 to the second account 138 for an amount corresponding to an order cost of the COD order.

Figure 5:
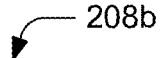
FIG. 5 depicts an example user interface depicting a notification displayed in accordance with data transactions facilitating collect-on-delivery.

FIG. 5 depicts an example user interface 500 depicting a notification displayed in accordance with data transactions facilitating collect-on-delivery. The user interface 500 includes a notification 208b displayed on the display device 128 of the first device 102. More specifically, the notification 208b is displayed responsive to (1) a location prediction 204 that the first user 124 will not be present at the delivery location during the delivery time slot but at least one data sharing member of the data sharing group will be present at the delivery location during the delivery time slot and (2) an account of the at least one data sharing member has not been associated with an ability to complete COD orders on behalf of the first user 124 via the data sharing service 108.

Here, the notification 208b includes an indication of when the COD order is scheduled to be delivered, an indication of the at least one data sharing member that is expected to be at the delivery location during the delivery time slot, and an indication of an order cost of the COD order. In addition, the notification 208b includes a reminder to arrange for physical order completion resources (e.g., cash, credit card, debit card, etc.) to be present at the delivery location in order to enable the at least one data sharing member to complete the COD order. In one or more implementations, the location prediction 204 includes a time when the first user 124 is expected to leave the delivery location, e.g., based on historical location patterns of the first device 102 and/or calendar data indicative of future scheduled events away from the delivery location. Given this, the notification 208a is displayed before the first user 124 is expected to leave the delivery location, thereby enabling the user to leave physical payment means at the delivery location.

FIG. 6 illustrates a flow chart depicting an example method 600 of data transactions facilitating collect-on-delivery in accordance with one or more implementations. Although the method 600 is described below as implemented at the first device 102 initiating a data transaction to a second device 104 for facilitating completion of a COD order, it is to be appreciated that operations of the method 600 are implementable by the second device 104 initiating a data transaction to the first device 102 for facilitating completion of a COD order.

At 602, an indication is received that a collect-on-delivery order associated with a first user is scheduled to be delivered at a delivery location during a particular time slot. The COD facilitation module 158, for instance, receives the COD order indication 202 indicating that a COD order associated with the first user 124 is scheduled to be delivered at a delivery location during a delivery time slot. In one or more implementations, the COD order includes a data transaction criterion associated with an order. In at least one example, the data transaction criterion is an order cost, or a payment amount that is to be tendered in order to complete the COD order.

At 604, first estimated location data for a first device of the first user and second estimated location data for a second device of a second user are received, and the first device and the second device are interconnected via a data sharing application. For instance, the first device 102 and the second device 104 are interconnected via a data sharing application 140, 142 and/or a data sharing service 108. This interconnection enables the devices 102, 104 to exchange various types of personal and/or device data, such as location data. Given this, the COD facilitation module 158 receives the estimated location data 146 of the first device 102 and the estimated location data 148 of the second device 104. The estimated location data 146, 148 can correspond to a current location of the devices 102, 104 or a future estimated location of the devices 102, 104, e.g., based on calendar data and/or historical location patterns of the devices 102, 104.

At 606, a prediction is made based on the first estimated location data and the second estimated location data that the first user will not be present at the delivery location during the particular time slot, and the second user will be present at the delivery location during the particular time slot. The COD facilitation module 158, for instance, executes a location prediction 204 based on the estimated location data 146, 148 of the devices 102, 104. The location prediction 204 is that the first user 124 will not be present at the delivery location during the delivery time slot, but the second user 126 will be present at the delivery location during the delivery time slot.

At 608, a data transaction is initiated from a first account associated with the first device to a second account associated with the second device based on a data status of the second account indicating that the second account is unable to meet a data transaction criterion of the collect-on-delivery order. The first user 124 maintains a first account 134 with the transaction application 132 and/or the transaction service 106, while the second user 126 maintains a second account 138 with the transaction application 136 and/or transaction service 106. Moreover, as part of the interconnection of the devices 102, 104 via the data sharing application 140, 142 and/or data sharing service 108, the first user 124 and the second user 126 have consented to exchanging account information 154, 156 of the accounts 134, 138, respectively, between the devices 102, 104.

Thus, the COD facilitation module 158 receives account information 156 of the second account 138 from the second device 104 indicating a data status of the second account 138, e.g., an account balance of the second account 138. Here, the data status is indicative of an inability of the second account 138 to meet the data transaction criterion of the COD order, e.g., the account balance is less than the order cost of the COD order. Given this, the COD facilitation module 158 initiates a payment transaction from the first account 134 of the first user 124 to the second account 138 of the second user 126. The payment transaction represents a data transaction at least based on the notion that data is generated and communicated in response to initiation of the payment transaction. The payment transaction is for an amount sufficient to enable completion of the COD order.

FIG. 7 illustrates a flow chart depicting an example method 700 of data transactions facilitating collect-on-delivery in accordance with one or more implementations. Although the method 700 is described below as implemented at the second device 104 receiving a data transaction from the first device 102 for facilitating completion of a COD order, it is to be appreciated that operations of the method 700 are performable at the first device 102 receiving a data transaction from the second device 104 for facilitating completion of a COD order.

At 702, estimated location data for a second mobile device of a second user is communicated to an first mobile device of a first user, and the second mobile device and the first mobile device are interconnected via a data sharing application. For instance, the first device 102 and the second device 104 are interconnected via a data sharing application 140, 142 and/or a data sharing service 108. This interconnection enables the devices 102, 104 to exchange various types of personal and/or device data, such as location data. Given this, the second device 104 communicates estimated location data 148 of the second device 104 to the COD facilitation module 158 of the first device 102. The estimated location data 148 can correspond to a current location of the second device 104 or a future estimated location of the second device, e.g., based on calendar data and/or historical location patterns of the second device 104.

At 704, a data status of a second account associated with the second mobile device is communicated to the first device before a particular time slot at which a collect-on-delivery order associated with the first user is scheduled to be delivered at a delivery location. By way of example, the first user 124 maintains a first account 134 with the transaction application 132 and/or the transaction service 106, while the second user 126 maintains a second account 138 with the transaction application 136 and/or transaction service 106. Moreover, as part of the interconnection of the devices 102, 104 via the data sharing application 140, 142 and/or data sharing service 108, the first user 124 and the second user 126 have consented to exchanging account information 154, 156 of the accounts 134, 138, respectively, between the devices 102, 104.

Given this, the second device 104 communicates account information 156 associated with the second account 138 to the COD facilitation module 158 of the first device 102. The account information 156 includes a data status of the second account, e.g., an account balance of the second account 138. In one or more implementations, the account information 156 is communicated responsive to receiving a request from the COD facilitation module 158 requesting the account information 156. In at least one example, the request is communicated to the second device 104 based on a predetermined amount of time remaining until the delivery time slot.

At 706, a data transaction is received from a first account associated with the first mobile device to the second account based on the data status of the second account indicating that the second account is unable to meet a data transaction criterion of the collect-on-delivery order and a prediction that the second user will be present but the first user will not be present at the delivery location during the particular time slot, and the prediction is based at least in part on the estimated location data. The COD facilitation module 158 of the first device 102, for instance, executes a location prediction 204 that the first user 124 will not be present at the delivery location during the delivery time slot, but the second user 126 will be present at the delivery location during the delivery time slot, e.g., based on the estimated location data 146 of the first device 102 and the estimated location data 148 of the second device 104. In addition, the COD facilitation module 158 of the first device 102 executes a COD completion inability detection 206 that the data status of the second account 138 is unable to meet the data transaction criterion of the COD order, e.g., the account balance of the second account 138 is less than the order cost of the COD order.

Given this, the COD facilitation module 158 initiates a payment transaction from the first device 102, which is received by the second device 104. More specifically, the payment transaction is from the first account 134 to the second account 138. The payment transaction represents a data transaction at least based on the notion that data is generated and communicated in response to initiation of the payment transaction. The payment transaction is for an amount sufficient to enable completion of the COD order.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 8:
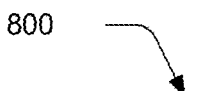
FIG. 8 illustrates various components of an example device in which aspects of data transactions facilitating collect-on-delivery can be implemented in accordance with one or more implementations.

FIG. 8 illustrates various components of an example device 800 in which aspects of data transactions facilitating collect-on-delivery can be implemented. The example device 800 can be implemented as any of the devices described with reference to the previous FIGS. 1-7, such as any type of mobile device, mobile phone, mobile device, wearable device, tablet, computing, communication, entertainment, gaming, media playback, and/or other type of electronic device. For example, the first device 102 and/or the second device 104 as shown and described with reference to FIGS. 1-7 may be implemented as the example device 800.

The device 800 includes communication transceivers 802 that enable wired and/or wireless communication of device data 804 with other devices. The device data 804 can include any of device identifying data, device location data, wireless connectivity data, and wireless protocol data. Additionally, the device data 804 can include any type of audio, video, and/or image data. Example communication transceivers 802 include wireless personal area network (WPAN) radios compliant with various IEEE 802.15 (Bluetooth™) standards, wireless local area network (WLAN) radios compliant with any of the various IEEE 802.10 (Wi-Fi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 800 may also include one or more data input ports 806 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 800 includes a processing system 808 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 810. The device 800 may further include any type of a system bus or other data and command transfer system that couples the various components within the device. A system bus can include any one or combination of different bus structures and architectures, as well as control and data lines.

The device 800 also includes computer-readable storage memory 812 (e.g., memory devices) that enable data storage, such as data storage devices that can be accessed by a computing device, and that provide persistent storage of data and executable instructions (e.g., software applications, programs, functions, and the like). Examples of the computer-readable storage memory 812 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 800 may also include a mass storage media device.

The computer-readable storage memory 812 provides data storage mechanisms to store the device data 804, other types of information and/or data, and various device applications 814 (e.g., software applications). For example, an operating system 816 can be maintained as software instructions with a memory device and executed by the processing system 808. The device applications 814 may include the transaction application 132, 136 and the data sharing application 140, 142. The device applications may also include a device manager, such as any form of a control application, software application, signal-processing and control module, code that is native to a particular device, a hardware abstraction layer for a particular device, and so on. Computer-readable storage memory 812 represents media and/or devices that enable persistent and/or non-transitory storage of information in contrast to mere signal transmission, carrier waves, or signals per se. Computer-readable storage memory 812 do not include signals per se or transitory signals.

In this example, the device 800 includes a COD facilitation module 818 that implements aspects of data transactions facilitating collect-on-delivery and may be implemented with hardware components and/or in software as one of the device applications 814. For example, the COD facilitation module 158 can be implemented as one or more of the COD facilitation module 158 or the COD facilitation module 160 described in detail above. In implementations, the COD facilitation module 818 may include independent processing, memory, and logic components as a computing and/or electronic device integrated with the device 800.

In this example, the example device 800 also includes a camera 820 and sensors 822. The sensors, for instance, may include motion sensors such as may be implemented in an inertial measurement unit (IMU). The motion sensors can be implemented with various sensors, such as a gyroscope, an accelerometer, and/or other types of motion sensors to sense motion of the device. The various motion sensors may also be implemented as components of an inertial measurement unit in the device. Additionally or alternatively, the sensors include global positioning system (GPS) sensors for location tracking.

The device 800 also includes a wireless module 824, which is representative of functionality to perform various wireless communication tasks. The device 800 can also include one or more power sources 826, such as when the device is implemented as a mobile device. The power sources 826 may include a charging and/or power system, and can be implemented as a flexible strip battery, a rechargeable battery, a charged super-capacitor, and/or any other type of active or passive power source.

The device 800 also includes an audio and/or video processing system 828 that generates audio data for an audio system 830 and/or generates display data for a display system 832. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 834. In implementations, the audio system and/or the display system are integrated components of the example device. Alternatively, the audio system and/or the display system are external, peripheral components to the example device.

Although implementations of data transactions facilitating collect-on-delivery have been described in language specific to features and/or methods, the subject of the appended claims is not necessarily limited to the specific features or methods described. Rather, the features and methods are disclosed as example implementations, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In some aspects, the techniques described herein relate to a system comprising at least one memory, and at least one processor coupled with the at least one memory and configured to cause the system to receive an indication that a collect-on-delivery order associated with a first user is scheduled to be delivered at a delivery location during a particular time slot, receive first estimated location data for a first device of the first user and second estimated location data for a second device of a second user, the first device and the second device interconnected via a data sharing application, predict, based at least in part on the first estimated location data and the second estimated location data, that the first user will not be present at the delivery location during the particular time slot, and the second user will be present at the delivery location during the particular time slot, and initiate a data transaction from a first account associated with the first device to a second account associated with the second device based at least in part on a data status of the second account indicating that the second account is unable to meet a data transaction criterion of the collect-on-delivery order.

In some aspects, the techniques described herein relate to a system, wherein the data transaction comprises a transfer of a first amount of data resources from the first account to the second account, the data status of the second account comprises a second amount of data resources held in the second account, and the data transaction criterion comprises a third amount of data resources associated with the collect-on-delivery order.

In some aspects, the techniques described herein relate to a system, wherein the at least one processor is further configured to cause the system to facilitate the interconnection of the first device and the second device via the data sharing application for location sharing between the first device and the second device, and sharing of account information of the first account and the second account between the first device and the second device.

In some aspects, the techniques described herein relate to a system, wherein the at least one processor is further configured to cause the system to receive, via the data sharing application, a user selection by the first user enabling the second account associated with the second user to complete collect-on-delivery orders on behalf of the first user, the data transaction initiated based at least in part on the user selection.

In some aspects, the techniques described herein relate to a system, wherein the at least one processor is further configured to cause the system to present, in a user interface of the first device, a notification including a first indication of when the collect-on-delivery order is scheduled to be delivered, a second indication that the second user is predicted to be present at the delivery location during the particular time slot, and a third indication that the second account is unable to meet the data transaction criterion of the collect-on-delivery order.

In some aspects, the techniques described herein relate to a system, wherein the notification includes a user interface element selectable to initiate the data transaction, and the at least one processor is further configured to cause the system to initiate the data transaction responsive to a user selection of the user interface element.

In some aspects, the techniques described herein relate to a system, wherein the at least one processor is configured to cause the system to predict that the first user will not be present at the delivery location during the particular time slot based at least in part on the first estimated location data including at least one of: current location data of the first device, calendar data of the first device indicating times and locations of future scheduled events, and historical location patterns of the first device.

In some aspects, the techniques described herein relate to a system, wherein the at least one processor is configured to cause the system to predict that the second user will be present at the delivery location during the particular time slot based at least in part on the second estimated location data including at least one of: current location data of the second device, calendar data of the second device indicating times and locations of future scheduled events, and historical location patterns of the second device.

In some aspects, the techniques described herein relate to a system, wherein the at least one processor is further configured to cause the system to receive third estimated location data for a third device of a third user, the third device interconnected with the first device and the second device via the data sharing application, predict, based at least in part on the second estimated location data and the third estimated location data, that the second user will no longer be present at the delivery location during the particular time slot, and the third user will be present at the delivery location during the particular time slot, and present, in a user interface of the first device, a notification reminding the first user to arrange for physical order completion resources being present at the delivery location to enable the third user to complete the collect-on-delivery order on behalf of the first user.

In some aspects, the techniques described herein relate to a system, wherein the at least one processor is further configured to present the notification based at least in part on an account associated with the third device having not been associated, via the data sharing application, with an ability to complete collect-on-delivery orders on behalf of the first user.

In some aspects, the techniques described herein relate to a second mobile device comprising at least one memory, and at least one processor coupled with the at least one memory and configured to cause the second mobile device to communicate estimated location data for the second mobile device of a second user to a first mobile device of a first user, the second mobile device and the first mobile device interconnected via a data sharing application, communicate a data status of a second account associated with the second mobile device to the first mobile device before a particular time slot at which a collect-on-delivery order associated with the first user is scheduled to be delivered at a delivery location, and receive a data transaction from a first account associated with the first mobile device to the second account based at least in part on the data status of the second account indicating that the second account is unable to meet a data transaction criterion of the collect-on-delivery order, and a prediction that the second user will be present but the first user will not be present at the delivery location during the particular time slot, the prediction based at least in part on the estimated location data.

In some aspects, the techniques described herein relate to a second mobile device, wherein the data transaction comprises a transfer of a first amount of data resources from the first account to the second account, the data status of the second account comprises a second amount of data resources held in the second account, and the data transaction criterion comprises a third amount of data resources associated with the collect-on-delivery order.

In some aspects, the techniques described herein relate to a second mobile device, wherein the at least one processor is further configured to cause the second mobile device to facilitate the interconnection of the second mobile device and the first mobile device via the data sharing application for location sharing between the second mobile device and the first mobile device, and sharing of account information of the second account and the first account between the second mobile device and the first mobile device.

In some aspects, the techniques described herein relate to a method comprising receiving, by a first device, an indication that a collect-on-delivery order associated with a first user of the first device is scheduled to be delivered at a delivery location during a particular time slot, receiving, by the first device, first estimated location data for the first device and second estimated location data for a second device of a second user, the first device and the second device interconnected via a data sharing application, generating, based at least in part on the first estimated location data and the second estimated location data, a prediction that the first user will not be present at the delivery location during the particular time slot, and the second user will be present at the delivery location during the particular time slot, and initiating a data transaction from a first account associated with the first device to a second account associated with the second device based at least in part on the prediction.

In some aspects, the techniques described herein relate to a method, wherein initiating the data transaction includes receiving, from the second device, account information indicating a data status of the second account, and initiating the data transaction based at least in part on the data status indicating that the second account is unable to meet a data transaction criterion of the collect-on-delivery order.

In some aspects, the techniques described herein relate to a method, wherein the data transaction comprises a transfer of a first amount of data resources from the first account to the second account, the data status of the second account comprises a second amount of data resources held in the second account, and the data transaction criterion comprises a third amount of data resources associated with the collect-on-delivery order.

In some aspects, the techniques described herein relate to a method, further comprising facilitating the interconnection of the first device and the second device via the data sharing application for location sharing between the first device and the second device, and sharing of account information of the first account and the second account between the first device and the second device.

In some aspects, the techniques described herein relate to a method, wherein initiating the data transaction includes receiving, via the data sharing application, a user selection by the first user enabling the second account associated with the second user to complete collect-on-delivery orders on behalf of the first user.

In some aspects, the techniques described herein relate to a method, further comprising displaying, in a user interface of the first device, a notification including a first indication of when the collect-on-delivery order is scheduled to be delivered and a second indication that the second user is predicted to be present at the delivery location during the particular time slot.

In some aspects, the techniques described herein relate to a method, wherein the notification includes a user interface element selectable to initiate the data transaction, and initiating the data transaction occurs responsive to a user selection of the user interface element.

The invention claimed is:

1. A system comprising:

at least one memory; and at least one processor coupled with the at least one memory and configured to cause the system to:

receive an indication that a collect-on-delivery order associated with a first user is scheduled to be delivered at a delivery location during a particular time slot;

collect, by one or more sensors of a first device associated with a first user, first estimated location data for the first device;

receive second estimated location data for a second device associated with a second user as collected by one or more sensors of the second device, the first device and the second device interconnected via a data sharing application;

predict, based at least in part on the first estimated location data and the second estimated location data, that the first user will not be present at the delivery location during the particular time slot, and the second user will be present at the delivery location during the particular time slot; and initiate a data transaction from a first account associated with the first device to a second account associated with the second device based at least in part on a data status of the second account indicating that the second account is unable to meet a data transaction criterion of the collect-on-delivery order.

2. The system of claim 1, wherein the data transaction comprises a transfer of a first amount of data resources from the first account to the second account, the data status of the second account comprises a second amount of data resources held in the second account, and the data transaction criterion comprises a third amount of data resources associated with the collect-on-delivery order.

3. The system of claim 1, wherein the at least one processor is further configured to cause the system to facilitate the interconnection of the first device and the second device via the data sharing application for location sharing between the first device and the second device, and sharing of account information of the first account and the second account between the first device and the second device.

4. The system of claim 1, wherein the at least one processor is further configured to cause the system to receive, via the data sharing application, a user selection by the first user enabling the second account associated with the second user to complete collect-on-delivery orders on behalf of the first user, the data transaction initiated based at least in part on the user selection.

5. The system of claim 1, wherein the at least one processor is further configured to cause the system to present, in a user interface of the first device, a notification including a first indication of when the collect-on-delivery order is scheduled to be delivered, a second indication that the second user is predicted to be present at the delivery location during the particular time slot, and a third indication that the second account is unable to meet the data transaction criterion of the collect-on-delivery order.

6. The system of claim 5, wherein the notification includes a user interface element selectable to initiate the data transaction, and the at least one processor is further configured to cause the system to initiate the data transaction responsive to a user selection of the user interface element.

7. The system of claim 1, wherein the at least one processor is configured to cause the system to predict that the first user will not be present at the delivery location during the particular time slot based at least in part on the first estimated location data including at least one of: current location data of the first device, calendar data of the first device indicating times and locations of future scheduled events, and historical location patterns of the first device.

8. The system of claim 1, wherein the at least one processor is configured to cause the system to predict that the second user will be present at the delivery location during the particular time slot based at least in part on the second estimated location data including at least one of: current location data of the second device, calendar data of the second device indicating times and locations of future scheduled events, and historical location patterns of the second device.

9. The system of claim 1, wherein the at least one processor is further configured to cause the system to:

receive third estimated location data for a third device of a third user, the third device interconnected with the first device and the second device via the data sharing application;

predict, based at least in part on the second estimated location data and the third estimated location data, that the second user will no longer be present at the delivery location during the particular time slot, and the third user will be present at the delivery location during the particular time slot; and present, in a user interface of the first device, a notification reminding the first user to arrange for physical order completion resources being present at the delivery location to enable the third user to complete the collect-on-delivery order on behalf of the first user.

10. The system of claim 9, wherein the at least one processor is further configured to present the notification based at least in part on an account associated with the third device having not been associated, via the data sharing application, with an ability to complete collect-on-delivery orders on behalf of the first user.

11. A second mobile device comprising:

at least one memory; and at least one processor coupled with the at least one memory and configured to cause the second mobile device to:

collect, by one or more sensors of the second mobile device, estimated location data for the second mobile device associated with a second user;

communicate the estimated location data to a first mobile device associated with a first user, the second mobile device and the first mobile device interconnected via a data sharing application;

communicate a data status of a second account associated with the second mobile device to the first mobile device before a particular time slot at which a collect-on-delivery order associated with the first user is scheduled to be delivered at a delivery location; and receive a data transaction from a first account associated with the first mobile device to the second account based at least in part on the data status of the second account indicating that the second account is unable to meet a data transaction criterion of the collect-on-delivery order, and a prediction that the second user will be present but the first user will not be present at the delivery location during the particular time slot, the prediction based at least in part on the estimated location data.

12. The second mobile device of claim 11, wherein the data transaction comprises a transfer of a first amount of data resources from the first account to the second account, the data status of the second account comprises a second amount of data resources held in the second account, and the data transaction criterion comprises a third amount of data resources associated with the collect-on-delivery order.

13. The second mobile device of claim 11, wherein the at least one processor is further configured to cause the second mobile device to facilitate the interconnection of the second mobile device and the first mobile device via the data sharing application for location sharing between the second mobile device and the first mobile device, and sharing of account information of the second account and the first account between the second mobile device and the first mobile device.

14. A method comprising:

receiving, by a first device, an indication that a collect-on-delivery order associated with a first user of the first device is scheduled to be delivered at a delivery location during a particular time slot;

collecting, by one or more sensors of the first device, first estimated location data for the first device;

receiving, by the first device, second estimated location data for a second device associated with a second user as collected by one or more sensors of the second device, the first device and the second device interconnected via a data sharing application;

generating, based at least in part on the first estimated location data and the second estimated location data, a prediction that the first user will not be present at the delivery location during the particular time slot, and the second user will be present at the delivery location during the particular time slot; and initiating a data transaction from a first account associated with the first device to a second account associated with the second device based at least in part on the prediction.

15. The method of claim 14, wherein initiating the data transaction includes:

receiving, from the second device, account information indicating a data status of the second account; and initiating the data transaction based at least in part on the data status indicating that the second account is unable to meet a data transaction criterion of the collect-on-delivery order.

16. The method of claim 15, wherein the data transaction comprises a transfer of a first amount of data resources from the first account to the second account, the data status of the second account comprises a second amount of data resources held in the second account, and the data transaction criterion comprises a third amount of data resources associated with the collect-on-delivery order.

17. The method of claim 14, further comprising facilitating the interconnection of the first device and the second device via the data sharing application for location sharing between the first device and the second device, and sharing of account information of the first account and the second account between the first device and the second device.

18. The method of claim 14, wherein initiating the data transaction includes receiving, via the data sharing application, a user selection by the first user enabling the second account associated with the second user to complete collect-on-delivery orders on behalf of the first user.

19. The method of claim 14, further comprising displaying, in a user interface of the first device, a notification including a first indication of when the collect-on-delivery order is scheduled to be delivered and a second indication that the second user is predicted to be present at the delivery location during the particular time slot.

20. The method of claim 19, wherein the notification includes a user interface element selectable to initiate the data transaction, and initiating the data transaction occurs responsive to a user selection of the user interface element.

* * * * *